(12) United States Patent
Taylor et al.

(10) Patent No.: US 7,753,252 B2
(45) Date of Patent: Jul. 13, 2010

(54) METHOD FOR CONSTRUCTION OF PRESSURE VESSELS WITH A LINER USING FRICTION STIRRING PROCESSES

(75) Inventors: Brian E. Taylor, Draper, UT (US); Richard A. Flak, Springville, UT (US); Russell J. Steel, Salem, UT (US); Scott M. Packer, Alpine, UT (US)

(73) Assignees: Smith International, Houston, TX (US); SII Megadiamond, Provo, UT (US); Advanced Metal Products, West Bountiful, UT (US)

( * ) Notice: Subject to any disclaimer, the term of this patent is extended or adjusted under 35 U.S.C. 154(b) by 434 days.

(21) Appl. No.: 11/381,978

(22) Filed: May 5, 2006

(65) Prior Publication Data

US 2006/0255094 A1 Nov. 16, 2006

Related U.S. Application Data

(60) Provisional application No. 60/678,244, filed on May 5, 2005.

(51) Int. Cl.
*B23K 20/12* (2006.01)
(52) U.S. Cl. .................................... 228/112.1; 228/2.1
(58) Field of Classification Search ................. 228/2.1, 228/112.1
See application file for complete search history.

(56) References Cited

U.S. PATENT DOCUMENTS

| 4,718,239 | A | * | 1/1988 | Nowobilski et al. ......... 62/50.4 |
| 5,046,638 | A | | 9/1991 | Wolf |
| 5,217,140 | A | * | 6/1993 | Lindahl ..................... 220/4.06 |
| 5,368,073 | A | | 11/1994 | Murphy |
| 5,697,511 | A | * | 12/1997 | Bampton ................... 220/4.12 |
| 6,364,197 | B1 | * | 4/2002 | Oelgoetz et al. ......... 228/112.1 |
| 6,648,206 | B2 | | 11/2003 | Nelson et al. |
| 6,732,901 | B2 | | 5/2004 | Nelson et al. |
| 6,779,704 | B2 | | 8/2004 | Nelson et al. |
| 7,043,887 | B2 | | 5/2006 | Van Ootmarsum |
| 7,124,929 | B2 | | 10/2006 | Nelson et al. |
| 2002/0179674 | A1 | * | 12/2002 | Schilling et al. ............. 228/2.1 |
| 2004/0134972 | A1 | | 7/2004 | Nelson et al. |
| 2005/0006439 | A1 | | 1/2005 | Packer et al. |
| 2005/0035173 | A1 | | 2/2005 | Steel et al. |
| 2005/0051602 | A1 | | 3/2005 | Babb et al. |
| 2005/0061853 | A1 | | 3/2005 | Packer et al. |
| 2005/0082342 | A1 | | 4/2005 | Babb et al. |
| 2005/0142005 | A1 | | 6/2005 | Traylor |
| 2005/0156010 | A1 | | 7/2005 | Flak et al. |
| 2005/0252341 | A1 | | 11/2005 | Allen et al. |
| 2006/0032333 | A1 | | 2/2006 | Steel et al. |
| 2006/0032891 | A1 | | 2/2006 | Flak et al. |
| 2006/0049234 | A1 | | 3/2006 | Flak et al. |
| 2006/0081683 | A1 | | 4/2006 | Packer et al. |
| 2006/0144843 | A1 | | 7/2006 | Vandal et al. |
| 2006/0157531 | A1 | | 7/2006 | Packer et al. |
| 2006/0175382 | A1 | | 8/2006 | Packer et al. |
| 2006/0182500 | A1 | | 8/2006 | Crabtree et al. |
| 2006/0208034 | A1 | | 9/2006 | Packer et al. |

* cited by examiner

*Primary Examiner*—Jessica L. Ward
*Assistant Examiner*—Nicholas P D'Aniello
(74) *Attorney, Agent, or Firm*—Morriss O'Bryant Compagni, P.C.

(57) ABSTRACT

A system and method for using friction stir welding, friction stir processing, and friction stir mixing to create pressure vessels, pipes or other containers comprised of a single material or multiple layers of different materials, and having superior strength and endurance characteristics.

24 Claims, 6 Drawing Sheets

METHOD FOR CONSTRUCTION OF PRESSURE VESSELS WITH A LINER USING FRICTION STIRRING PROCESSES

BACKGROUND OF THE INVENTION

1. Field of the Invention

This invention relates generally to a system and method for disposing a liner material inside of a container or pipe. More specifically, the present invention enables the construction of a pressure vessel having an inner liner, where the pressure vessel and the inner liner are comprised of two different materials, and wherein there is an advantage to manufacturing the pressure vessel from the two different materials.

2. Description of Related Art

In general, a pressure vessel is a storage tank or vessel that has been designed to operate at pressure. Inspections of pressure vessels have shown that there are often a considerable number of cracked and damaged vessels in operation at workplaces. Cracked and damaged pressure vessels can result in leakage or rupture failures. These failures may be catastrophic, defined as causing damage to property or people in the vicinity. Potential health and safety hazards of leaking vessels include poisonings, suffocations, fires, and explosion hazards. Rupture failures are typically much more catastrophic than leaks, and can cause considerable damage to life and property. The safe design, installation, operation, and maintenance of pressure vessels in accordance with appropriate codes and standards are essential to worker safety and health, and protection of the environment.

Common materials held and maintained by pressure vessels include air, water, nitrogen, refrigerants (like Freon), ammonia, propane, and reactor fuels. Due to the pressurizing capabilities of pressure vessels, they are often used to store chemicals and elements that can change states (most notably gases that have been liquidized). In most cases, the walls of pressure vessels are thicker than normal tanks, and thus providing greater protection for people and property when in use with hazardous or explosive materials.

Pressure vessels are used in a variety of industries including chemical, cosmetics, food and beverage, oil/fuel, transportation, paper and pulp, pharmaceutical and plastic processing, and power generation.

Many pressure vessels have built-in temperature control characteristics (heating only, cooling only or both heating and cooling) in addition to pressurizing capabilities. This can help to keep volatile chemicals in relatively inert states, or when necessary, change the state of the material to prepare it for transportation or use in a connected system.

Pressure sources for pressure vessels are limited to the maximum allowable working pressure of the lowest rated system component. When sources cannot be limited, the use of pressure-relief devices is required. Common relief devices include spring-loaded relief valves and rupture disc assemblies. Additional precautions such as audible alarms and computer regulation are often necessary in systems where pressure relief is necessary, especially if the material being contained is hazardous in nature.

To increase the strength and the lifetime of pressure vessels, some pressure vessels are manufactured using expensive or more exotic materials. For example, the costly material titanium can be used for the entire pressure vessel. However, the cost of a large titanium pressure vessel can be prohibitive. Thus, many pressure vessels are manufactured using two or more different materials in layers. For example, an inner liner material may provide needed corrosion resistance, while an outer layer or shell may provide strength to keep the pressure vessel intact when pressurized. The inner liner protects the outer shell from corrosion, while the outer shell prevents the inner liner from being physically breached.

The attachment of an inner liner to an outer shell can be accomplished using traditional welding techniques or mechanical fixturing. Disadvantageously, conventional techniques such as arc welding are not performed as a solid state process, resulting in problems in heat affected zones. These problems include corrosion and cracking that can result in failure of the pressure vessel.

Other methods known to those skilled in the art for improving pressure vessels include cladding and surface treating.

It is interesting to note that in many cases there are many regulations regarding the materials and processes that can be used to manufacture pressure vessels for particular industries. These regulations have the unintended disadvantage of also functioning to prohibit innovation in materials and processes used in pressure vessel construction.

Accordingly, it would be an advantage over the state of the art to provide a system and method for creating improved pressure vessels, pipes, and other containers. It would also be an advantage to provide a system and method that can pass the requirements of existing regulations so that no new certification and testing processes are necessary.

BRIEF SUMMARY OF THE INVENTION

It is an aspect of the present invention to provide an improved pressure vessel, pipe or other container comprised of at least two different materials that are joined using a solid state process such as friction stir welding.

It is another aspect of the present invention to provide an improved pressure vessel, pipe or other container comprised of a single material that is modified using friction stir processing.

It is another aspect to provide a system and method for creating an improved pressure vessel, pipe or other container using friction stir mixing.

In a preferred embodiment, the present invention is a system and method for using friction stir welding, friction stir processing, and friction stir mixing to create pressure vessels, pipes or other containers comprised of a single material or multiple layers of different materials, and having superior strength and endurance characteristics.

These and other aspects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

A first embodiment of the invention is a system and method for using friction stir welding, friction stir processing, and/or friction stir mixing to thereby improve the characteristics of a pressure vessel, pipe, or other container.

It should be understood from the outset that while many of the examples shown in this document are related to pressure vessels, the principles of the present invention are more broadly applicable to any container or pipe having an outer layer made of a first material and an inner liner made of a second material. Furthermore, the inner liner does not have to be a complete covering, and therefore may only cover or make contact with small portions of the inside surface of the outer layer. However, the present invention has particular application to pressure vessels and pipes because of issues of strength and endurance that are desirable for such structures.

When discussing the present invention, it is useful to understand that the shape of the pressure vessel, pipe or container should not be considered a limiting factor. Accordingly, the present invention enables an improvement in characteristics of any shape of pressure vessel, pipe or container that is constructed using the teachings of the present invention.

The following figures are provided as examples of applying the principles of the present invention to the creation of pipes.

Figure 1:
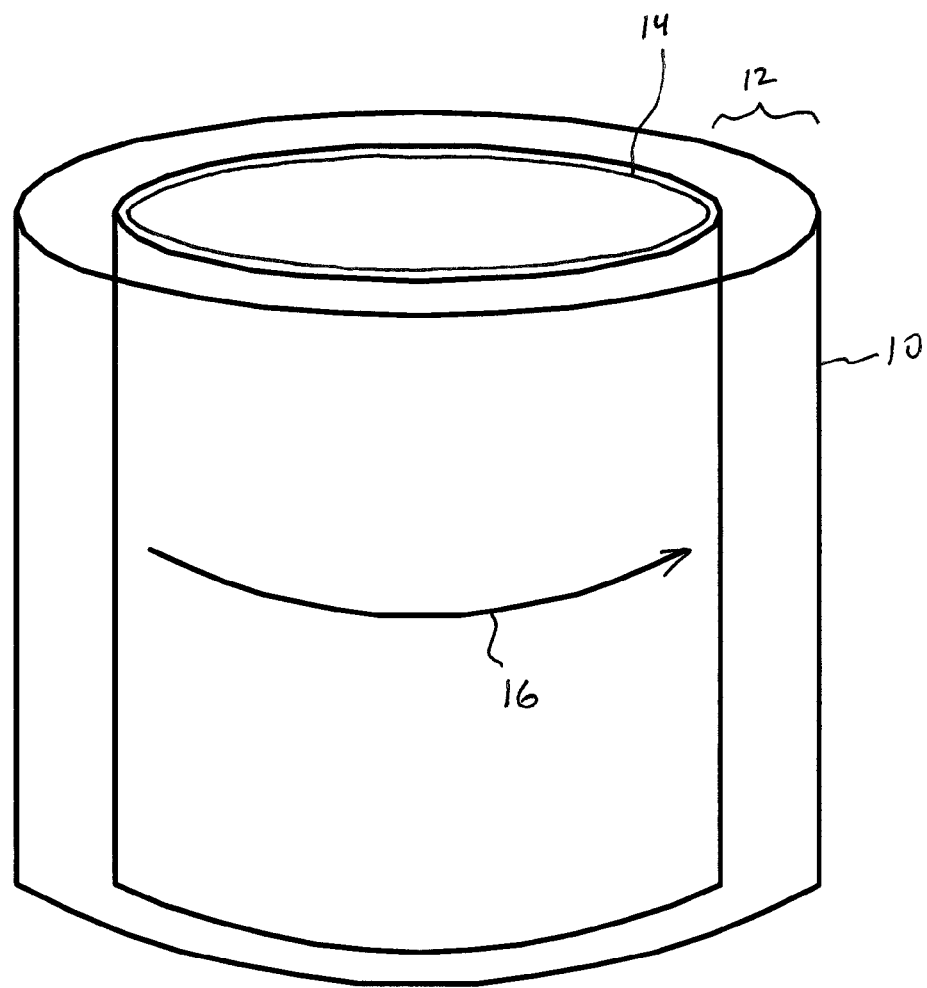
FIG. 1 is a perspective view of a liner that is spot welded to an inside surface of a container by an internal friction stir welding process.

Beginning with FIG. 1, a see-through perspective view is provided of a pipe 10, having a thickness 12. On an inside surface of the pipe 10, a liner 14 can be seen which is spot welded to the inside surface of the pipe by friction stir welding. Thus, a friction stir welding tool was used from the inside of the pipe/liner combination to spot weld the liner 14 to the pipe 10 along the weld line 16. Thus, weld line 16 is seen between the liner 14 and the pipe 10, and is not on the outside surface of the pipe. The liner 14 can be welded in as many locations as are necessary to secure the liner to the inside surface of the pipe 10. Only a single weld is shown for illustration purposes only, and it should not be inferred that additional welds are not necessary.

By using friction stir welding to attach the liner 14 to the inside surface of the pipe 10, a solid state weld is achieved. The friction stir weld has superior corrosion resistance and resistance to cracking.

One aspect of the present invention is made apparent when friction stir welding austenitic stainless steels, duplex stainless steels, and nickel base alloys. Specifically, the friction stir welding process reduces grain size. Reduction in grain size increases the tensile and yield strength.

Another aspect of the friction stir welding process of joining the liner 14 to the pipe 10 is that corrosion resistance is increased over arc welding because arc welding processes typically deposit weld layers of stainless steel or nickel base alloys.

Arc welding is also a "liquid" process, as opposed to the solid state friction stir welding process. When arc welding liquefies the liner material and the material to which it is being welded in the procedure known as "cladding", the two materials will mix in this liquid state, thereby causing dilution of the materials. Dilution will reduce the corrosion resistance properties of the liner 14 along the weld.

Figure 2:
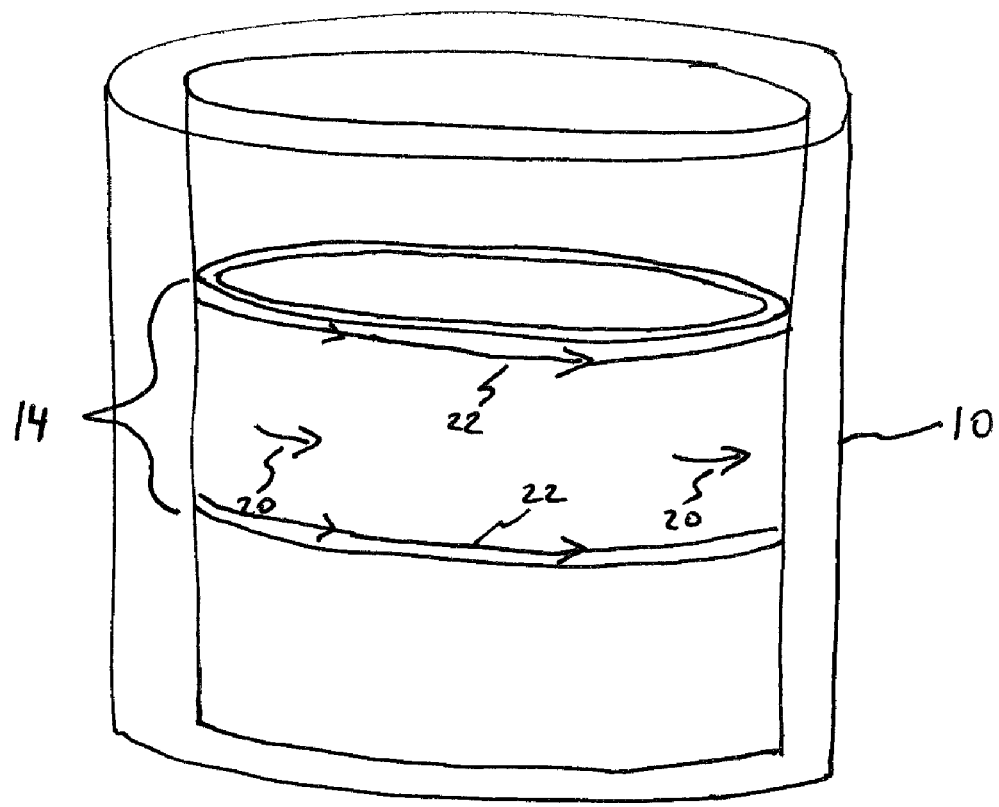
FIG. 2 is a perspective view of a liner that is spot welded to the inside surface of the container using friction stir welding, and then seam welded to make tight using friction stir welding.

FIG. 2 is a perspective view of the liner 14 that is welded to the inside surface of the pipe 10 using friction stir welding along spot weld lines 20, and then seam welded along friction stir welding lines 22 to make the liner watertight using friction stir welding. The pipe 10 is again shown in a see-through perspective so that the liner 14 inside is visible. Note that the liner 14 is much further inside the pipe 10 as compared to FIG. 1. The seam weld from a friction stir welding process is a solid state weld having all the advantages attributable to such a weld as discussed above.

Figure 3:
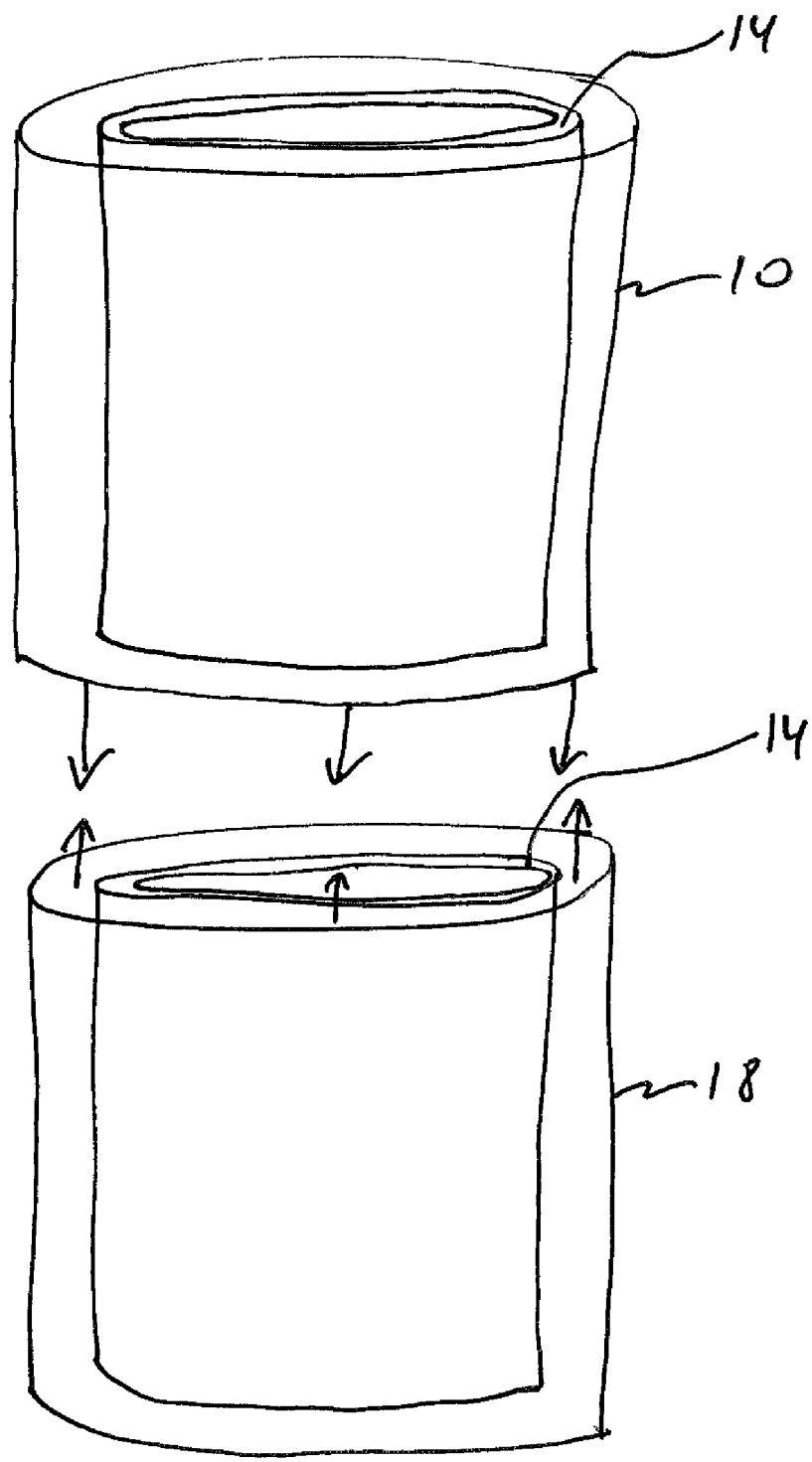
FIG. 3 is a perspective view of a liner that is spot welded to the inside surface of a container, which is then joined to another container using friction stir welding tools disposed inside and/or outside of the container.

FIG. 3 is a perspective view of the liner 14 that is spot welded using friction stir welding to the inside surface of the container, pipe 10, which is then joined to another pipe 18 using friction stir welding tools disposed inside and/or outside of the container.

For example, consider two pipes 10, 18 that are to be joined together. These pipes 10, 18 are essentially the same as shown in FIG. 1, wherein an end of the pipe 10 and the liner 14 are flush. First, the liner 14 can be disposed inside the two halves using friction stir welding. Then, the two pipes 10, 18 can be joined using friction stir welding along the seam between them. The friction stir welding can be performed on the outside of the container, on the inside using a remote tool, or even from inside and outside.

Alternatively, it is noted that the two pipes 10, 18 can first be friction stir welded together along the seam between them. The second step would then be to friction stir spot weld a longer liner 14 inside the already joined pipes 10, 18.

Figure 4:
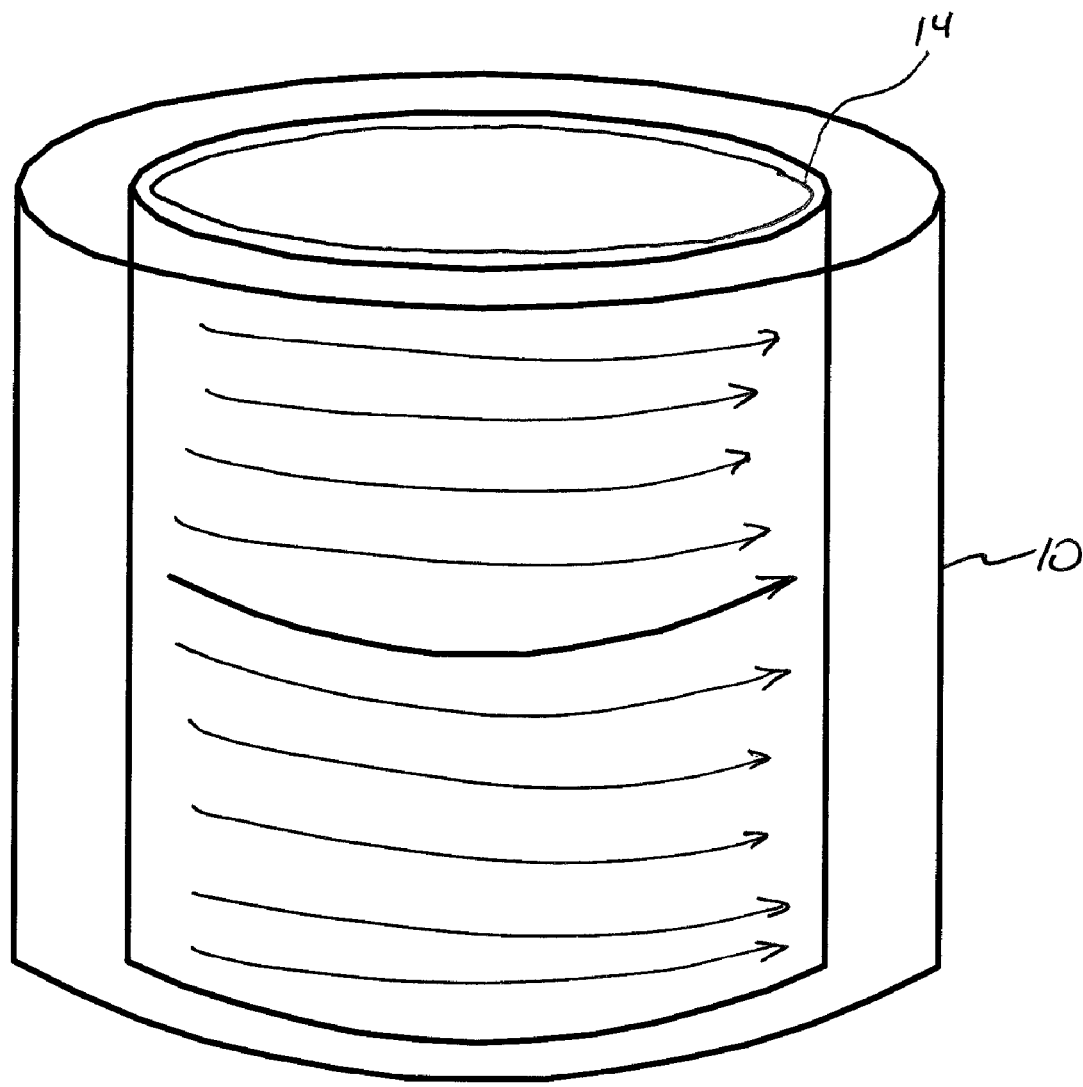
FIG. 4 is a perspective view of a liner that is friction stir processed across its entire surface and joined to the inside surface of the container.

FIG. 4 is a perspective view of the pipe 10 that has the liner 14 disposed therein. However, instead of friction stir spot welding the liner 14 to the pipe 10, the liner is friction stir processed across its entire surface and at the same time joined to the inside surface of the pipe 10. Friction stir processing is defined here as moving a friction stir processing tool along a surface of a material to either process the material, or process and join the material to an underlying material.

Figure 5:
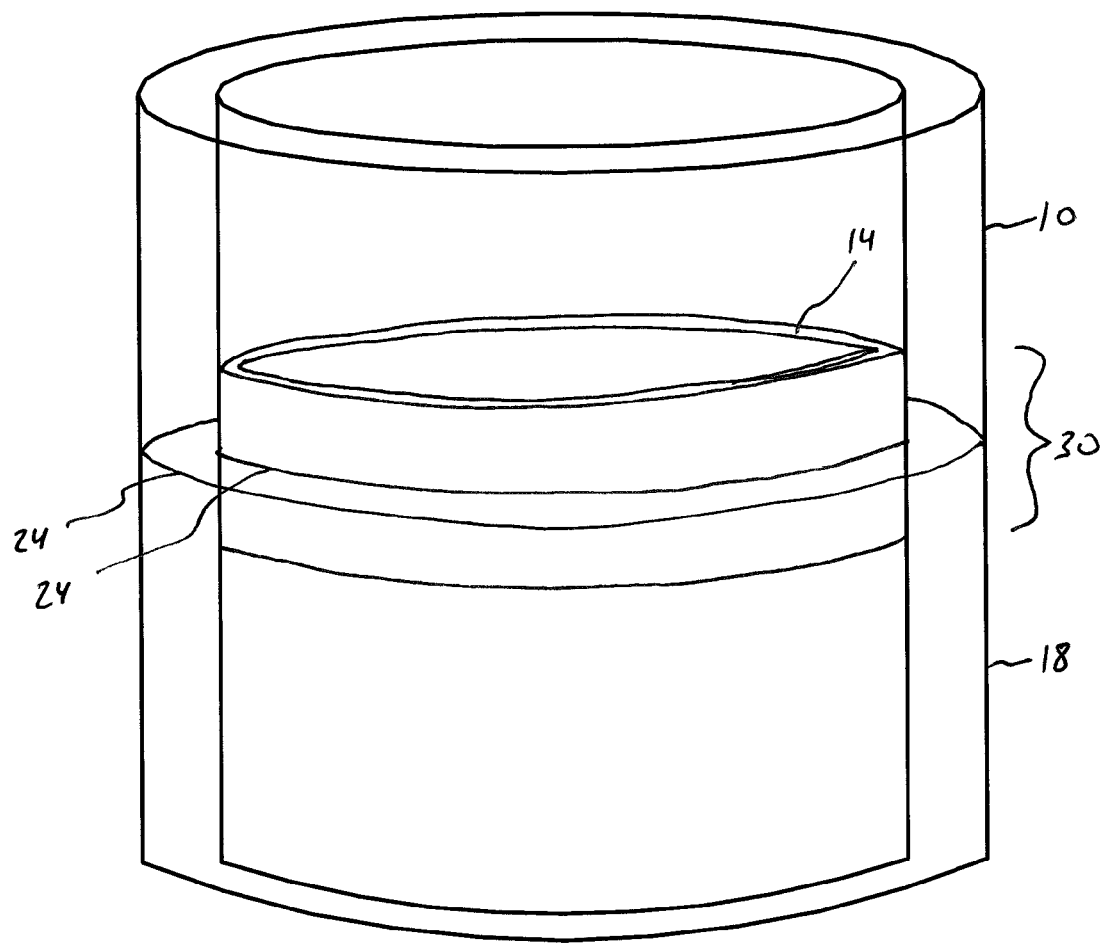
FIG. 5 is a perspective view of a liner disposed within a container, wherein the liner only covers a portion of the inside surface of the container.

FIG. 5 is a perspective view of a liner 14 disposed within the pipe 10, wherein the liner only covers a portion 30 of the inside surface of the container.

For example, consider two pipes 10, 18 that have been welded together along seam 24. The weld could be an inferior conventional weld or a superior friction stir weld. The liner 14 is disposed so as to cover the inside seam 24 between the two pipes 10, 18. The liner 14 is then friction stir welded to the inner surface and over the seam 24 between the two pipes 10, 18, or alternatively, friction stir processed into the seam.

Figure 6:
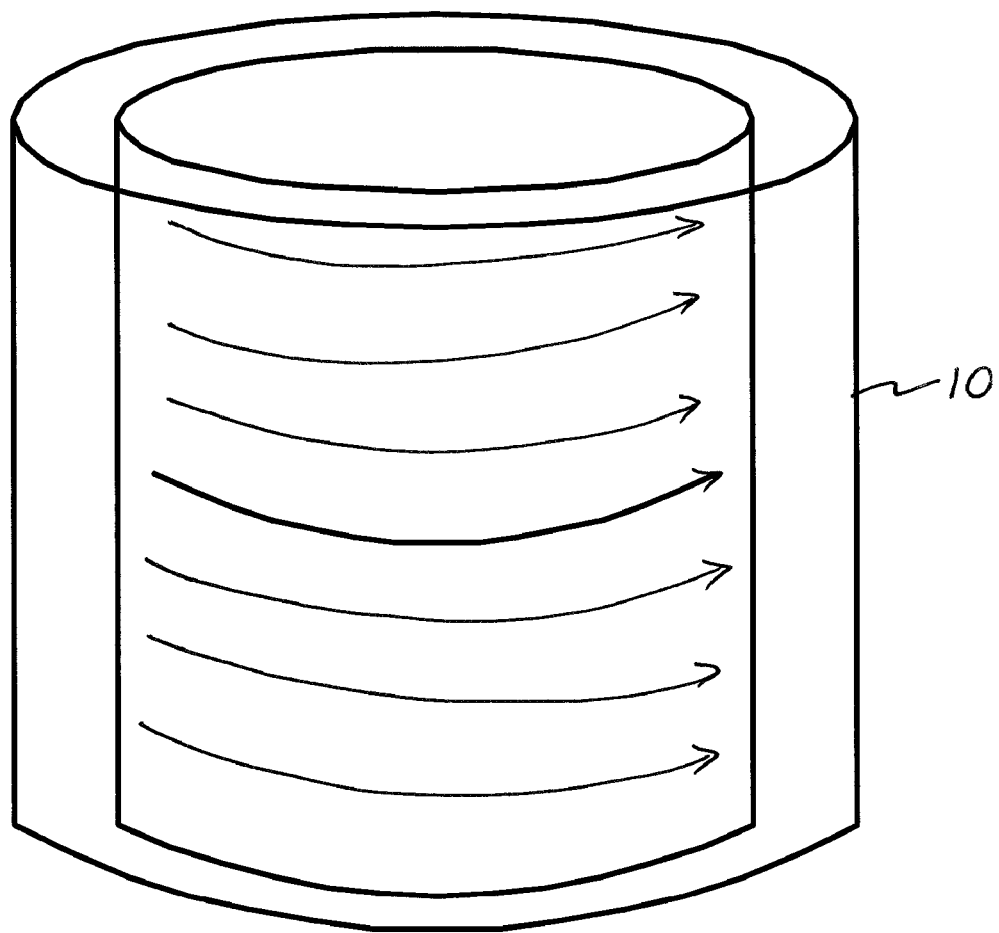
FIG. 6 is a perspective view of a container wherein the inside surface of the container has been friction stir processed to thereby materially alter the characteristics of the material of the container.

FIG. 6 is a perspective view of the pipe 10 wherein the inside surface of the pipe has been friction stir processed to thereby materially alter the characteristics of the material of the pipe itself. Thus, no liner is being used. By friction stir processing alone, the properties of the material comprising the pipe 10 are beneficially altered.

All of the friction stir welding and friction stir processing of the present invention can also be modified to include friction stir mixing, wherein at least one other material is mixed into a base material to thereby further alter the characteristics of the base material.

Another aspect of the present invention is that the friction stir welding, friction stir processing, and friction stir mixing can be performed on several different classes of materials. In one embodiment, the materials may be considered to be those materials that have melting temperatures higher than bronze and aluminum. This class of materials includes, but is not limited to, metal matrix composites, ferrous alloys such as steel and stainless steel, non-ferrous materials, superalloys, titanium, cobalt alloys typically used for hard-facing, and air hardened or high speed steels. In another embodiment, the materials may be considered to be all other lower melting temperature materials that are not included within the definition of the higher melting temperatures described above.

Some comments regarding friction stir welding, friction stir processing and friction stir mixing are useful at this time. Solid state processing and solid state joining methods have been developed to yield improved material and mechanical properties for new and existing materials, which are now being applied to the present invention, wherein containers can have a liner disposed therein through a friction stir process, or the material of the container altered through a friction stir process.

Processing and joining may be exclusive events of each other, or they may take place simultaneously. It is also noted that solid state processing may also be referred to interchangeably with the phrase "friction stir processing." Solid state processing is defined herein as a temporary transformation into a plasticized state that typically does not include a liquid phase. However, it is noted that some embodiments allow one or more elements to pass through a liquid phase, and still obtain the benefits of the present invention.

The benefits of solid state joining became apparent with the development of friction stir welding (FSW) when two or more materials were joined together. This method can be used to synthesize new or existing materials using both low melting temperature and high melting temperature materials.

Experimental results have demonstrated that the material being processed may undergo several important changes during friction stir processing. These changes include, but should not be considered limited to, the following: toughness, hardness, grain boundaries, grain size, distribution of phases, ductility, superplasticity, change in nucleation site densities, compressibility, expandability, friction, and thermal conductivity.

Regarding nucleation, observations indicate that there may be more nucleation sites due to the energy induced into the material from the heat and deformation generated during friction stir processing. Accordingly, more of the solute material may be able to come out of solution or precipitate to form higher densities of precipitates or second phases.

In some embodiments of the present invention, it is possible to selectively friction stir process large portions of a container material that are otherwise difficult to do with other heat treatment methods. In addition, a material designer can be more selective in the areas of the material that are to receive processing. Furthermore, although heat treatment will alter the microstructure of the material, the changes will not be the same type of changes that can be achieved with friction stir processing. For example, the processed area has also experienced a substantial increase in toughness. This is notable because there is typically a tradeoff between toughness and hardness when processing materials using conventional treatment techniques.

Another aspect of the present invention is the ability to both solid state process and join at the same time. Consider two workpieces being welded together. The workpieces could be the same material or different materials. By friction stir welding the workpieces together, the resulting material can have distinctly different properties in a weld region from those of the materials that are being joined together.

It is possible to introduce another material into a base material for friction stir mixing. However, the present invention should not be considered to be limited to this one design. Some other methods of introducing an additive material include, but are not limited to, entrenching a packed powder into the surface of a workpiece, sandwiching a material between workpieces to be joined together, and even using adhesives to bind the additive to the workpiece until friction stir mixed together. The adhesive can be selected so that it burns away during the friction stir mixing process, thereby not affecting the resulting mixed materials. However, it should be realized that it may be desirable to include whatever material is being used to bind an additive to a base material.

Another method of introducing an additive is through the use of a consumable tool. For example, a pin may be comprised of a material that will erode away into the base material. Thus, the pin is comprised of the additive material.

Another aspect of the present invention is the ability to modify and control residual surface and subsurface stress components in a processed material. In some embodiments, it is possible to introduce or increase compression stress, while in other embodiments, undesirable stresses may be reduced.

Controlling residual stresses may be particularly important in some high melting temperature materials. Friction stir processing and friction stir mixing includes contacting a workpiece with a rotating (or otherwise moving) friction stir processing or friction stir mixing tool to thereby generate a solid state processing of the material to modify stress along a surface of the material. Stress reduction should not be considered to be limited only to the surface. In other embodiments, the aspect of modifying subsurface stress is also a part of the present invention.

Some embodiments also enable a user to control heating and cooling rates by exercising control over process parameters. Friction stir processing and mixing parameters include relative motion of the tool (e.g., rotation rate and translational movement rate of the tool), depth of tool penetration, the downward force being applied to the tool, cooling rates along with cooling media (water cooling), etc.

All additive materials may be selected so as to control mechanical properties such as abrasion resistance, corrosion resistance, hardness, toughness, crack prevention, fatigue resistance, magnetic properties, and hydrogen embrittlement, among others, of the base material. For example, the hard particles will be held in place mechanically, or by solid state diffusion, with greater retention than cast structures since the strength of the mixing region may or may not be greater than in the base material.

Hard particles may include tungsten carbide, silicon carbide, aluminum oxide, cubic boron nitride, and/or diamond or any material harder than the base material that will not go fully into solution at the mixing temperature (usually 100 to 200 degrees C. below the melting point of the base material). In addition, fibers may be added in the same fashion to locally strengthen the base material or add directional properties.

Additive materials may be specifically selected for the ability to go into solution in order to achieve some specific characteristic of the processed base material. Additives can also enhance toughness, hardness, enhance thermal characteristics, etc.

Another advantage of putting additives into a base material is that particles or fibers can be selected from materials that cannot be used in fusion or hard facing processing because they would go into solution during a liquid phase of the base material. In friction stir processing, eutectic compositions of the particle/fiber with the base material can be avoided so that dual properties can be achieved. The introduction of the particle/fiber into the base material can be varied to tailor different properties within a given workpiece.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for joining a liner to an inner surface of a cylindrical container through an internal friction stir welding, said method comprising the steps of:
   1) providing a high melting temperature container material having a melting temperature higher than the melting temperature of aluminum and a liner material having a melting temperature higher than the melting temperature of aluminum;
   2) providing a friction stir welding tool inside the container that includes a higher melting temperature material than the container and liner material on a portion thereof; and
   3) friction stir welding the liner material to the inside surface of the container to thereby obtain a solid state joint between the container and the liner material, wherein the solid state joint has at least one modified characteristic, by applying the friction stir welding tool from an internal surface of the liner wherein the step of providing the liner provides a liner that completely covers the inner surface of the container.

2. The method as defined in claim 1 wherein the method further comprises the step of causing a substantially solid state transformation without passing though a liquid state of the container and the liner material.

3. The method as defined in claim 1 wherein the step of providing the high melting temperature container and liner material includes selecting the high melting temperature container and liner material from the group of high melting temperature materials including ferrous alloys, non-ferrous materials, superalloys, titanium, cobalt alloys typically used for hard-facing, and air hardened or high speed steels.

4. The method as defined in claim 1 wherein the method further comprises the step of synthesizing a new material having at least one different characteristic from the container and the liner material.

5. The method as defined in claim 1 wherein the method further comprises the steps of:
   1) providing an additive material; and
   2) friction stir mixing an additive material into the container and the liner material to thereby modify at least one characteristic of the container and the liner material.

6. The method as defined in claim 1 wherein the method further comprises the step of modifying a microstructure of the container and the liner material.

7. The method as defined in claim 6 wherein the method further comprises the step of modifying a macrostructure of the container and the liner material.

8. The method as defined in claim 7 wherein the step of modifying the microstructure includes increasing toughness of the container and the liner material.

9. The method as defined in claim 7 wherein the step of modifying the microstructure includes increasing or decreasing hardness of the container and the liner material.

10. The method as defined in claim 7 wherein the step of modifying the microstructure includes modifying grain boundaries of the container and the liner material.

11. The method as defined in claim 7 wherein the step of modifying the microstructure includes decreasing grain size of the container and the liner material.

12. The method as defined in claim 7 wherein the step of modifying the microstructure includes modifying distribution of phases of the container and the liner material.

13. The method as defined in claim 7 wherein the step of modifying the microstructure includes modifying ductility of the container and the liner material.

14. The method as defined in claim 7 wherein the step of modifying the microstructure includes modifying superplasticity of the container and the liner material.

15. The method as defined in claim 7 wherein the step of modifying the microstructure includes increasing nucleation site densities of the container and the liner material.

16. The method as defined in claim 7 wherein the step of modifying the microstructure includes modifying compressibility of the container and the liner material.

17. The method as defined in claim 7 wherein the step of modifying the microstructure includes modifying ductility of the container and the liner material.

18. The method as defined in claim 7 wherein the step of modifying the microstructure includes modifying the coefficient of friction of the container and the liner material.

19. The method as defined in claim 7 wherein the step of modifying the microstructure includes increasing or decreasing thermal conductivity.

20. The method as defined in claim 7 wherein the step of modifying the microstructure includes increasing abrasion resistance.

21. The method as defined in claim 7 wherein the step of modifying the microstructure includes increasing corrosion resistance.

22. The method as defined in claim 1 wherein the method further comprises the step of friction stir spot welding the liner to the container.

23. The method as defined in claim 1 wherein the method further comprises the step of friction stir seam welding the liner to the container, to thereby provide a seal therebetween.

24. The method as defined in claim 1 wherein the method further comprises the step of joining the liner to the container by friction stir processing of the entire surface of the liner.

* * * * *